(12) United States Patent
Yoshida et al.

(10) Patent No.: US 12,597,844 B2
(45) Date of Patent: Apr. 7, 2026

(54) POWER CONVERSION DEVICE

(71) Applicant: KABUSHIKI KAISHA TOYOTA JIDOSHOKKI, Aichi-ken (JP)

(72) Inventors: Kohei Yoshida, Kariya (JP); Naohiro Nomura, Kariya (JP); Naoki Akiyama, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 225 days.

(21) Appl. No.: 18/650,169

(22) Filed: Apr. 30, 2024

(65) Prior Publication Data

US 2024/0396426 A1    Nov. 28, 2024

(30) Foreign Application Priority Data

May 25, 2023    (JP) ................................. 2023-086363

(51) Int. Cl.
H02M 1/00        (2007.01)
H02J 7/06        (2006.01)
(Continued)

(52) U.S. Cl.
CPC ............... H02M 1/007 (2021.05); H02J 7/06 (2013.01); H02J 7/345 (2013.01); H02M 3/158 (2013.01);
(Continued)

(58) Field of Classification Search
CPC .... H02J 7/007; H02J 7/06; H02J 7/345; H02J 2207/20; H02J 2207/50; H02M 1/0003;
(Continued)

(56) References Cited

U.S. PATENT DOCUMENTS

2010/0045102 A1*    2/2010    Kitanaka ............. H02M 3/1588
                                                    323/311
2013/0322128 A1*    12/2013    Takegami ......... H02M 3/33507
                                                    363/17
(Continued)

FOREIGN PATENT DOCUMENTS

JP            2021-035067 A        3/2021
JP            2021112017 A    *    8/2021
WO        WO-2024143258 A1    *    7/2024    ................ H02J 7/02

*Primary Examiner* — Thienvu V Tran
*Assistant Examiner* — Shahzeb K Ahmad
(74) *Attorney, Agent, or Firm* — GREENBLUM & BERNSTEIN, P.L.C.

(57)        ABSTRACT

A controller determines whether alternating-current power, output from a bidirectional AC/DC converter, is greater than or equal to a predetermined value, and whether the voltage value of a capacitor, detected by a first voltage sensor, is greater than or equal to a threshold value. The controller stops controlling the bidirectional DC/DC converter when determining that the alternating-current power, output from the bidirectional AC/DC converter, is not greater than or equal to the predetermined value and that the voltage value of the capacitor is greater than or equal to the threshold value. The controller charges the capacitor by controlling the bidirectional DC/DC converter when determining that the alternating-current power, output from the bidirectional AC/DC converter, is not greater than or equal to the predetermined value and that the voltage value of the capacitor is less than the threshold value.

6 Claims, 2 Drawing Sheets

(51) Int. Cl.
  *H02J 7/34*        (2006.01)
  *H02M 3/158*      (2006.01)
  *H02M 7/217*      (2006.01)

(52) U.S. Cl.
  CPC ......... *H02M 7/217* (2013.01); *H02J 2207/20* (2020.01); *H02J 2207/50* (2020.01)

(58) Field of Classification Search
  CPC ............. H02M 1/0012; H02M 1/0032; H02M 1/0038; H02M 1/0054; H02M 1/007; H02M 1/10; H02M 3/158; H02M 3/335; H02M 3/33507; H02M 3/33584; H02M 7/155; H02M 7/1555; H02M 7/162; H02M 7/1623; H02M 7/217; H02M 7/219; H02M 7/66; H02M 7/68; H02M 7/757; H02M 7/797
  See application file for complete search history.

(56)                   References Cited

U.S. PATENT DOCUMENTS

2015/0054343 A1*   2/2015  Cui ....................... H02M 7/797
                                                          307/66
2020/0324665 A1*  10/2020  Mackenzie ............. B60L 53/22
2024/0136917 A1*   4/2024  Wang .................... H02M 3/07

* cited by examiner

START

↓

S1
Is alternating-current power greater than or equal to predetermined value?

NO →

YES
↓

S2
Supply alternating-current power to external device

S3
Is voltage value of capacitor greater than or equal to threshold value?

NO →

YES
↓

S4
Stop controlling bidirectional DC/DC converter

S5
Control bidirectional DC/DC converter

↓

END

POWER CONVERSION DEVICE

BACKGROUND

1. Field

The following description relates to a power conversion device.

2. Description of Related Art

A power conversion device disclosed in Japanese Laid-Open Patent Publication No. 2021-112017 includes a switching unit and a bidirectional charger. The switching unit switches between the connection between the bidirectional charger and an inlet and the connection between the bidirectional charger and an AC outlet. The inlet is connectable to an external power supply. When the inlet is connected to the external power source, the bidirectional charger can charge the battery. The AC outlet is connectable to an electric device. When the AC outlet is connected to the electric device, the bidirectional charger can supply power to the electric device.

The bidirectional charger may include an AC/DC converter and a bidirectional DC/DC converter. When power is supplied to the external device, the bidirectional DC/DC converter converts the power input from a battery and outputs the converted power to the AC/DC converter. The AC/DC converter converts the input direct-current power into alternating-current power and supplies the converted alternating-current power to the external device. The bidirectional DC/DC converter converts power by performing switching operations of switching elements. Driving of the bidirectional DC/DC converter increases power consumption in switching operations of the switching element even when the AC outlet is not connected to the external device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power conversion device includes a bidirectional AC/DC converter, an AC outlet, a bidirectional DC/DC converter, a capacitor, a controller, and a voltage detector. The bidirectional AC/DC converter converts input alternating-current power into direct-current power and outputs the direct-current power, and converts input direct-current power into alternating-current power and outputs the alternating-current power. The AC outlet is connectable to the bidirectional AC/DC converter. The bidirectional DC/DC converter converts the voltage value of the direct-current power, input from the bidirectional AC/DC converter, into a different voltage value and outputs converted direct-current power. The capacitor is arranged between the bidirectional AC/DC converter and the bidirectional DC/DC converter. The controller controls the bidirectional AC/DC converter and the bidirectional DC/DC converter. The voltage detector detects the voltage value of the capacitor. The controller is configured to determine whether the alternating-current power, output from the bidirectional AC/DC converter, is greater than or equal to a predetermined value, and whether the voltage value of the capacitor, detected by the voltage detector, is greater than or equal to a threshold value. The controller is configured to stop controlling the bidirectional DC/DC converter when determining that the alternating-current power, output from the bidirectional AC/DC converter, is not greater than or equal to the predetermined value and that the voltage value of the capacitor is greater than or equal to the threshold value. The controller is configured to charge the capacitor by controlling the bidirectional DC/DC converter when determining that the alternating-current power, output from the bidirectional AC/DC converter, is not greater than or equal to the predetermined value and that the voltage value of the capacitor is less than the threshold value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A power conversion device according to one embodiment will now be described.

Figure 1:
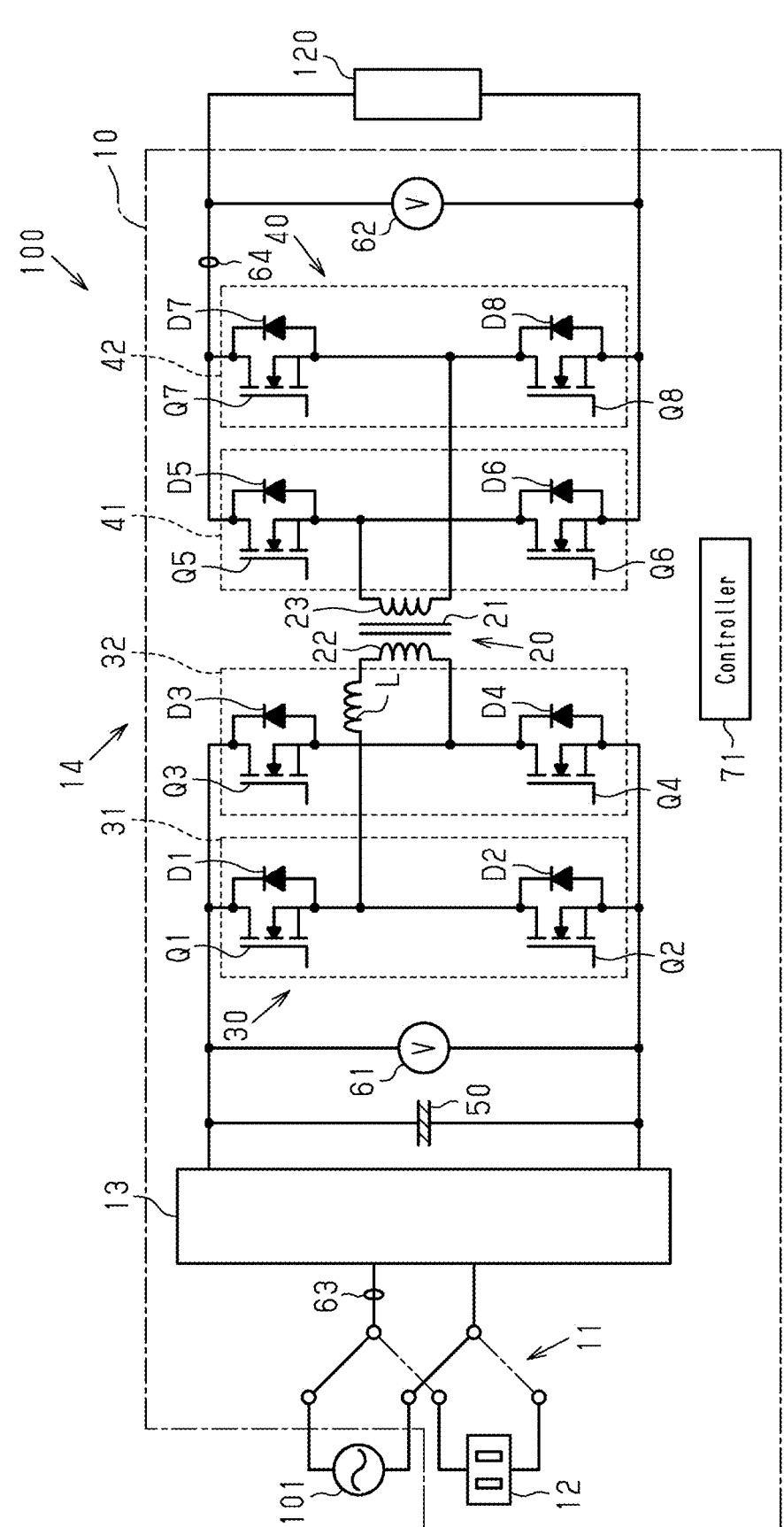
FIG. 1 is a circuit diagram of a power conversion device.

As shown in FIG. 1, a power supply system 100 includes a system power supply 101, a battery 120, and a power conversion device 10. The battery 120 is, for example, a rechargeable battery storing and discharging direct-current power. The rechargeable battery is, for example, a lithium-ion battery or a lead-acid battery.

Power Conversion Device

The power conversion device 10 includes a switching unit 11, an AC outlet 12, a bidirectional AC/DC converter 13, and a bidirectional DC/DC converter 14. The switching unit 11 is configured to select whether to electrically connect the bidirectional AC/DC converter 13 and the system power supply 101 to each other or to electrically connect the bidirectional AC/DC converter 13 and the AC outlet 12 to each other. The switching unit 11 is formed by, for example, two c-contact switches.

The AC outlet 12 is electrically connectable to an external device. The external device operates on alternating-current power input from the AC outlet 12.

Figures 2, 3:
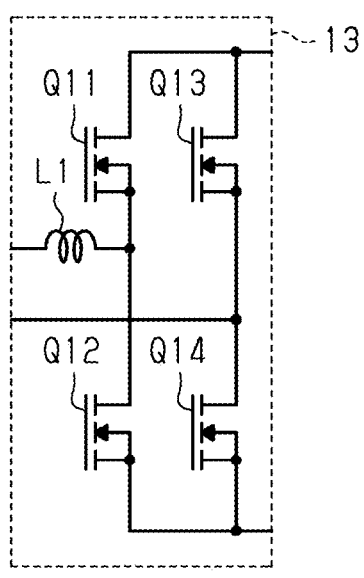
FIG. 2 is a circuit diagram of a bidirectional AC/DC converter.
FIG. 3 is a flowchart showing control performed by a controller.

As shown in FIG. 2, the bidirectional AC/DC converter 13 includes switching elements Q11 to Q14. The bidirectional AC/DC converter 13 performs switching operations with the switching elements Q11 to Q14 to convert input alternating-current power into direct-current power and output the direct-current power, and to convert input direct-current power into alternating-current power and output the alternating-current power. More specifically, the bidirectional AC/DC converter 13 includes four switching elements Q11 to Q14 and a reactor L1. The switching elements Q11 and Q12 are connected in series to each other. The switching elements Q13 and Q14 are connected in series to each other. A connection node between the switching elements Q11 and Q12 is electrically connected to the switching unit 11 by the reactor L1. A connection node between the switching elements Q13 and Q14 is electrically connected to the switching unit 11. The bidirectional AC/DC converter 13 is connected to the bidirectional DC/DC converter 14. When the system power supply 101 is electrically connected to the bidirectional AC/DC converter 13, the bidirectional AC/DC converter 13 converts alternating-current power, input from the system power supply 101, into direct-current power and outputs the direct-current power to the bidirectional DC/DC converter 14. When the AC outlet 12 is electrically connected to the bidirectional AC/DC converter 13, the bidirectional AC/DC converter 13 converts direct-current power, input from the bidirectional DC/DC converter 14, into alternating-current power and outputs the alternating-current power to the AC outlet 12. This supplies the alternating-current power to the external device from the AC outlet 12.

The bidirectional DC/DC converter 14 is a dual active bridge DC/DC converter. The bidirectional DC/DC converter 14 is arranged between the bidirectional AC/DC converter 13 and the battery 120. The bidirectional DC/DC converter 14 converts the voltage value of direct-current power, input from the bidirectional AC/DC converter 13, into a different voltage value and outputs the converted direct-current power to the battery 120. Further, the bidirectional DC/DC converter 14 converts the voltage value of direct-current power, input from the battery 120, into a different voltage value and outputs the converted direct-current power to the bidirectional AC/DC converter 13.

The bidirectional DC/DC converter 14 includes a transformer 20. The transformer 20 is an isolated type. The transformer 20 includes a magnetic core 21, a primary-side winding 22, and a secondary-side winding 23. The primary-side winding 22 and the secondary-side winding 23 are wound around the core 21. The transformer 20 includes a reactor L. The reactor L may be an element such as a choke coil, or may be a leakage inductance of the primary-side winding 22 and the secondary-side winding 23.

The bidirectional DC/DC converter 14 includes a primary-side full-bridge circuit 30. The primary-side full-bridge circuit 30 includes a first leg 31 and a second leg 32. The first leg 31 and the second leg 32 are connected in parallel to each other. The first leg 31 includes a first switching element Q1, a second switching element Q2, and diodes D1 and D2. The first switching element Q1 and the second switching element Q2 are connected in series to each other. The second leg 32 includes a third switching element Q3, a fourth switching element Q4, and diodes D3 and D4. The third switching element Q3 and the fourth switching element Q4 are connected in series to each other. The first switching element Q1 and the third switching element Q3 form an upper arm. The second switching element Q2 and the fourth switching element Q4 form a lower arm.

The first switching element Q1, the second switching element Q2, the third switching element Q3, and the fourth switching element Q4 are multiple primary-side switching elements Q1 to Q4. The primary-side switching elements Q1 to Q4 are, for example, n-type metal oxide semiconductor field effect transistors (MOSFETs). The primary-side switching elements Q1 to Q4 may be p-type MOSFETs, insulated gate bipolar transistors (IGBTs), or GaN-HEMTs.

The diodes D1 to D4 are respectively connected in parallel to the primary-side switching elements Q1 to Q4. The diodes D1 to D4 may be parasitic diodes or elements.

A connection node between the first switching element Q1 and the second switching element Q2 and a connection node between the third switching element Q3 and the fourth switching element Q4 are connected to the primary-side winding 22. Thus, the primary-side full-bridge circuit 30 is connected to the primary-side winding 22.

The bidirectional DC/DC converter 14 includes a secondary-side full-bridge circuit 40. The secondary-side full-bridge circuit 40 includes a third leg 41 and a fourth leg 42. The third leg 41 includes a fifth switching element Q5, a sixth switching element Q6, and diodes D5 and D6. The fifth switching element Q5 and the sixth switching element Q6 are connected in series to each other. The fourth leg 42 includes a seventh switching element Q7, an eighth switching element Q8, and diodes D7 and D8. The seventh switching element Q7 and the eighth switching element Q8 are connected in series to each other. The fifth switching element Q5 and the seventh switching element Q7 form an upper arm. The sixth switching element Q6 and the eighth switching element Q8 form a lower arm.

The fifth switching element Q5, the sixth switching element Q6, the seventh switching element Q7, and the eighth switching element Q8 are multiple secondary-side switching elements Q5 to Q8. The secondary-side switching elements Q5 to Q8 are, for example, n-type MOSFETs. The secondary-side switching elements Q5 to Q8 may be p-type MOSFETs, IGBTs, or GaN-HEMTs.

The diodes D5 to D8 are respectively connected in parallel to the secondary-side switching elements Q5 to Q8. The diodes D5 to D8 may be parasitic diodes or elements.

A connection node between the fifth switching element Q5 and the sixth switching element Q6 and a connection node between the seventh switching element Q7 and the eighth switching element Q8 are connected to the secondary-side winding 23. Thus, the secondary-side full-bridge circuit 40 is connected to the secondary-side winding 23.

The third leg 41 and the fourth leg 42 are connected to the battery 120 so that the third leg 41 and the fourth leg 42 are connected in parallel to each other. The secondary-side full-bridge circuit 40 is electrically connected to the battery 120. The output power of the secondary-side full-bridge circuit 40 is supplied to the battery 120. This allows the power conversion device 10 to charge the battery 120.

The power conversion device 10 includes a capacitor 50. The capacitor 50 is a link capacitor or a smoothing capacitor. The capacitor 50 is connected in parallel to the first leg 31 and the second leg 32. The capacitor 50 is arranged between the bidirectional AC/DC converter 13 and the bidirectional DC/DC converter 14.

The power conversion device 10 includes a first voltage sensor 61. The first voltage sensor 61 serves as a voltage detector that detects the voltage value of the capacitor 50.

The power conversion device 10 includes a second voltage sensor 62. The second voltage sensor 62 detects the voltage value of the battery 120.

The power conversion device 10 includes a first current sensor 63. The first current sensor 63 detects the current value of current output from the bidirectional AC/DC converter 13 to the AC outlet 12.

The power conversion device 10 includes a second current sensor 64. The second current sensor 64 detects the current value of current input from the battery 120 to the bidirectional DC/DC converter 14.

The power conversion device 10 includes a controller 71. The controller 71 includes a processor and a storage unit. The processor may be, for example, a central processing unit (CPU), a graphics processing unit (GPU), or a digital signal processor (DSP). The storage unit includes a random-access memory (RAM) and a read-only memory (ROM). The storage unit stores program codes or instructions configured to cause the processor to execute processes. The storage unit, which is a computer-readable medium, includes any type of medium that is accessible by a general-purpose computer or a dedicated computer. The controller 71 may be configured by a hardware circuit such as an application specific integrated circuit (ASIC) or a field programmable gate array (FPGA). The controller 71, which is processing circuitry, may include one or more processors that operate according to a computer program, one or more hardware circuits such as an ASIC or an FPGA, or a combination thereof.

The controller 71 controls the bidirectional AC/DC converter 13 and the bidirectional DC/DC converter 14. When the bidirectional AC/DC converter 13 is electrically connected to the system power supply 101, the controller 71 controls the power conversion device 10 so that the power conversion device 10 converts alternating-current power, input from the system power supply 101, into direct-current power and outputs the direct-current power to the battery 120. Specifically, the controller 71 performs switching operations with the switching elements Q11 to Q14 of the bidirectional AC/DC converter 13 so that the bidirectional AC/DC converter 13 converts alternating-current power, input from the system power supply 101, into direct-current power and outputs the direct-current power. At the same time, the controller 71 performs switching operations with the primary-side switching elements Q1 to Q4 and the secondary-side switching elements Q5 to Q8 so that the bidirectional DC/DC converter 14 converts the voltage value of the input direct-current power into a different voltage value and outputs the converted direct-current power.

When the AC outlet 12 is connected to an external device, the controller 71 controls the power conversion device 10 so that the power conversion device 10 converts direct-current power, input from the battery 120, into alternating-current power and outputs the alternating-current power to the AC outlet 12. Specifically, the controller 71 performs switching operations with the primary-side switching elements Q1 to Q4 and the secondary-side switching elements Q5 to Q8 so that the bidirectional DC/DC converter 14 converts the voltage value of direct-current power, input from the battery 120, into a different voltage value and outputs the converted direct-current power. At the same time, the controller 71 performs switching operations with the switching elements Q11 to Q14 of the bidirectional AC/DC converter 13 so that the bidirectional AC/DC converter 13 converts the input direct-current power into alternating-current power and outputs the alternating-current power.

The controller 71 performs the following control when the power conversion device 10 converts direct-current power, input from the battery 120, into alternating-current power and outputs the alternating-current power to the AC outlet 12. In other words, the following control is performed when the power conversion device 10 does not charge the battery 120. The following control is repeatedly performed at predetermined control cycles.

Control Performed by Controller

As shown in FIG. 3, in step S1, the controller 71 determines whether alternating-current power, output from the bidirectional AC/DC converter 13, is greater than or equal to a predetermined value. For example, when the current value of current flowing through the AC outlet 12 is greater than or equal to a value determined in advance, the controller 71 determines that the alternating-current power, output from the bidirectional AC/DC converter 13, is greater than or equal to the predetermined value. The predetermined value of alternating-current power is, for example, a minimum value of alternating-current power output from the bidirectional AC/DC converter 13 in a state in which the AC outlet 12 is electrically connected to an external device. In other words, in the present embodiment, the predetermined value of alternating-current power is set to determine whether the AC outlet 12 is electrically connected to the external device. The value determined in advance is, for example, 1 A. For example, when the current value of the current flowing through the AC outlet 12 is less than the value determined in advance, the controller 71 determines that the alternating-current power, output from the bidirectional AC/DC converter 13, is not greater than or equal to the predetermined value. The current value of the current flowing through the AC outlet 12 is obtained by the first current sensor 63. When the determination result of step S1 is affirmative, the controller 71 proceeds to step S2. When the determination result of step S1 is negative, the controller 71 proceeds to step S3.

In step S2, the controller 71 performs switching operations with the primary-side switching elements Q1 to Q4 and the secondary-side switching elements Q5 to Q8 so that the bidirectional DC/DC converter 14 converts the voltage value of direct-current power, input from the battery 120, into a different voltage value and outputs the converted direct-current power. At the same time, the controller 71 performs switching operations with the switching elements Q11 to Q14 of the bidirectional AC/DC converter 13 so that the bidirectional AC/DC converter 13 converts the direct-current power, input from the bidirectional DC/DC converter 14, into alternating-current power and outputs the alternating-current power. This supplies the alternating-current power to the external device.

In step S3, the controller 71 determines whether the voltage value of the capacitor 50 is greater than or equal to a threshold value. The voltage value of the capacitor 50 can be obtained by the first voltage sensor 61. The threshold value is set to allow for a steady output of alternating-current power to the external device even in a case of a fluctuating load when, for example, the AC outlet 12 is electrically connected to the external device. When the load fluctuates, the voltage value of the capacitor 50 may sharply decrease, adversely affecting the steady output of the alternating-current power to the external device. The threshold value is set to a voltage value that allows for a steady output of alternating-current power to the external device even when the voltage value of the capacitor 50 decreases due to the fluctuating load. When the determination result of step S3 is affirmative, the controller 71 proceeds to step S4. When the determination result of step S3 is negative, the controller 71 proceeds to step S5.

In step S4, the controller 71 stops controlling the bidirectional DC/DC converter 14. Specifically, the controller 71 stops switching operations of the primary-side switching elements Q1 to Q4 and the secondary-side switching elements Q5 to Q8.

In step S5, the controller 71 controls the bidirectional DC/DC converter 14. Specifically, the controller 71 performs switching operations with the primary-side switching elements Q1 to Q4 and the secondary-side switching elements Q5 to Q8. This charges the capacitor 50. In this case, the controller 71 performs the switching operations with the primary-side switching elements Q1 to Q4 and the secondary-side switching elements Q5 to Q8 so that output power of the primary-side full-bridge circuit 30 is constant. For example, the controller 71 performs control to have constant output power of the primary-side full-bridge circuit 30 by performing control so that an input current, input from the battery 120 to the bidirectional DC/DC converter 14, is constant. The input current can be obtained by the second current sensor 64. The controller 71 performs the control to have constant input current by performing a feedback control to reduce the deviation between a target input current and the input current. For example, rapid charging of the capacitor 50 to have a desired voltage may generate an inrush current. Thus, in the present embodiment, the controller 71 performs switching operations with the primary-side switching elements Q1 to Q4 and the secondary-side switching elements Q5 to Q8 so that the output power of the primary-side full-bridge circuit 30 is constant.

Operation of Present Embodiment

The controller 71 stops controlling the bidirectional DC/DC converter 14 when determining that alternating-current power, output from the bidirectional AC/DC converter 13, is not greater than or equal to the predetermined value and that the voltage value of the capacitor 50 is greater than or equal to the threshold value. In the present embodiment, when the alternating-current power, output from the bidirectional AC/DC converter 13, is not greater than or equal to the predetermined value, the AC outlet 12 is not electrically connected to an external device. In this case, the controller 71 stops controlling the bidirectional DC/DC converter 14.

The controller 71 controls the bidirectional DC/DC converter 14 when determining that the alternating-current power, output from the bidirectional AC/DC converter 13, is not greater than or equal to the predetermined value and that the voltage value of the capacitor 50 is less than the threshold value. This charges the capacitor 50.

Advantages of Present Embodiment (1) The controller 71 stops controlling the bidirectional DC/DC converter 14 when determining that alternating-current power, output from the bidirectional AC/DC converter 13, is not greater than or equal to the predetermined value and that the voltage value of the capacitor 50 is greater than or equal to the threshold value. This reduces power consumption resulting from switching operations. The controller 71 controls the bidirectional DC/DC converter 14 when determining that the alternating-current power, output from the bidirectional AC/DC converter 13, is not greater than or equal to the predetermined value and that the voltage value of the capacitor 50 is less than the threshold value. Specifically, the controller 71 intermittently operates the bidirectional DC/DC converter 14 in accordance with the voltage value of the capacitor 50. This avoids a situation in which the voltage value of the capacitor 50 is less than the threshold value.

(2) The power conversion device 10 includes the switching unit 11 configured to select whether to electrically connect the system power supply 101 and the bidirectional AC/DC converter 13 to each other or to electrically connect the AC outlet 12 and the bidirectional AC/DC converter 13 to each other. When the system power supply 101 and bidirectional AC/DC converter 13 are electrically connected, the battery 120 is charged by controlling the bidirectional AC/DC converter 13 and the bidirectional DC/DC converter 14.

(3) The controller 71 controls the bidirectional DC/DC converter 14 so that the output power of the bidirectional DC/DC converter 14 is constant when determining that the alternating-current power, output from the bidirectional AC/DC converter 13, is not greater than or equal to the predetermined value and that the voltage value of the capacitor 50 is less than the threshold value. The rate at which the voltage value of the capacitor 50 increases depends on power supplied to the capacitor 50. When greater power is supplied to the capacitor 50, the voltage value of the capacitor 50 may excessively increase depending on the equivalent series resistance of the capacitor 50. An overvoltage in the capacitor 50 is avoided by setting the output power so that the voltage value of the capacitor 50 does not excessively increase and performing control so that the output power is constant.

Modifications

The present embodiment may be modified as follows. The present embodiment and the following modifications can be combined as long as the combined modifications remain technically consistent with each other.

The controller 71 may perform a constant phase shift amount control when determining that the alternating-current power, output from the bidirectional AC/DC converter 13, is not greater than or equal to the predetermined value and that the voltage value of the capacitor 50 is less than the threshold value. The constant phase shift amount control maintains a constant phase shift amount between the primary-side full-bridge circuit 30 and the secondary-side full-bridge circuit 40. The primary-side full-bridge circuit 30 is switched between a first operation in which the first switching element Q1 and the fourth switching element Q4 are simultaneously on and a second operation in which the second switching element Q2 and the third switching element Q3 are simultaneously on. The secondary-side full-bridge circuit 40 is switched between a third operation in which the fifth switching element Q5 and the eighth switching element Q8 are simultaneously on and a fourth operation in which the sixth switching element Q6 and the seventh switching element Q7 are simultaneously on. The phase shift amount is a phase difference between a time of switching between the first operation and the second operation and a time of switching between the third operation and the fourth operation.

The controller 71 may perform a feedback control so that the voltage of the capacitor 50 is constant when determining that the alternating-current power, output from the bidirectional AC/DC converter 13, is not greater than or equal to the predetermined value and that the voltage value of the capacitor 50 is less than the threshold value. In this case, the controller 71 performs the feedback control to reduce the deviation between a target voltage and the voltage value of the capacitor 50.

The controller 71 may maintain the operation of the bidirectional AC/DC converter 13 without a stop even when determining that the alternating-current power, output from the bidirectional AC/DC converter 13, is not greater than or equal to the predetermined value.

Thus, even when the alternating-current power supplied to the external device is small and the controller 71 erroneously determines that the alternating-current power, output from the bidirectional AC/DC converter 13, is not greater than or equal to the predetermined value, the power supply to the external device will not be cut.

Further, if the controller 71 stops the bidirectional AC/DC converter 13 when the alternating-current power supplied to the external device is small, activation would be delayed when the alternating-current power supplied to the external device is to be increased. A delay in activation is avoided by maintaining the operation of the bidirectional AC/DC converter 13 while intermittently operating the bidirectional DC/DC converter 14.

In step S1, the controller 71 may determine whether the alternating-current power, output from the bidirectional AC/DC converter 13, is greater than or equal to the predetermined value from the power value of power output to the AC outlet 12.

In step S1, when the current value of the current flowing through the AC outlet 12 is continuously less than the value determined in advance for a predetermined time or more, the controller 71 may determine that the alternating-current power, output from the bidirectional AC/DC converter 13, is not greater than or equal to the predetermined value. The predetermined time is, for example, 10 seconds.

The bidirectional DC/DC converter 14 may be any type of converter that includes switching elements to convert the voltage value of input direct-current power into a different voltage value and outputs the converted direct-current power. The bidirectional DC/DC converter 14 may be, for example, a non-isolated type.

The bidirectional AC/DC converter 13 may be any type of converter that includes switching elements to convert input direct-current power into alternating-current power and to convert input alternating-current power into direct-current power, and outputs the converted power.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power conversion device, comprising:
a bidirectional AC/DC converter that converts input alternating-current power into direct-current power and outputs the direct-current power, and converts input direct-current power into alternating-current power and outputs the alternating-current power;

an AC outlet connectable to the bidirectional AC/DC converter;

a bidirectional DC/DC converter that converts a voltage value of the direct-current power, input from the bidirectional AC/DC converter, into a different voltage value and outputs converted direct-current power;

a capacitor arranged between the bidirectional AC/DC converter and the bidirectional DC/DC converter;

a controller that controls the bidirectional AC/DC converter and the bidirectional DC/DC converter; and a voltage detector that detects a voltage value of the capacitor, wherein the controller is configured to determine whether the alternating-current power, output from the bidirectional AC/DC converter, is greater than or equal to a predetermined value, and whether the voltage value of the capacitor, detected by the voltage detector, is greater than or equal to a threshold value, the controller is configured to stop controlling the bidirectional DC/DC converter when determining that the alternating-current power, output from the bidirectional AC/DC converter, is not greater than or equal to the predetermined value and that the voltage value of the capacitor is greater than or equal to the threshold value, and the controller is configured to charge the capacitor by controlling the bidirectional DC/DC converter when determining that the alternating-current power, output from the bidirectional AC/DC converter, is not greater than or equal to the predetermined value and that the voltage value of the capacitor is less than the threshold value.

2. The power conversion device according to claim 1, further comprising:
a switching unit configured to select whether to electrically connect a system power supply and the bidirectional AC/DC converter to each other or to electrically connect the AC outlet and the bidirectional AC/DC converter to each other.

3. The power conversion device according to claim 2, wherein the controller is configured to charge the capacitor by controlling the bidirectional DC/DC converter so that an output power of the bidirectional DC/DC converter is constant when determining that the alternating-current power, output from the bidirectional AC/DC converter, is not greater than or equal to the predetermined value and that the voltage value of the capacitor is less than the threshold value.

4. The power conversion device according to claim 1, wherein the controller is configured to charge the capacitor by controlling the bidirectional DC/DC converter so that an output power of the bidirectional DC/DC converter is constant when determining that the alternating-current power, output from the bidirectional AC/DC converter, is not greater than or equal to the predetermined value and that the voltage value of the capacitor is less than the threshold value.

5. The power conversion device according to claim 1, wherein the predetermined value is a minimum value of the alternating-current power, output from the bidirectional AC/DC converter, in a state in which the AC outlet is electrically connected to an external device.

6. The power conversion device according to claim 1, wherein the threshold value is set to a voltage value that allows for a steady output of alternating-current power to an external device in a case in which a load fluctuates due to the AC outlet being electrically connected to the external device.

* * * * *